United States Patent [19]

Tucker

[11] 4,039,467
[45] Aug. 2, 1977

[54] VISIBLY OPAQUE INFRARED TRANSMITTING OPTICAL FILTER CONTAINING A COMBINATION OF COPPER AND VANADYL PHTHALOCYANINE SULFONAMIDES

[75] Inventor: Robert Jerome Tucker, Hackettstown, N.J.

[73] Assignee: American Cyanamid Company, Stamford, Conn.

[21] Appl. No.: 587,506

[22] Filed: June 16, 1975

[51] Int. Cl.² .............................................. F21V 9/06
[52] U.S. Cl. .................................................. 252/300
[58] Field of Search ..................... 252/300; 260/314.5

[56] References Cited

U.S. PATENT DOCUMENTS

| | | | |
|---|---|---|---|
| 2,300,572 | 11/1942 | Hoyer et al. | 260/314.5 |
| 3,291,746 | 12/1966 | Donoian | 252/300 |
| 3,853,783 | 12/1974 | Tucker | 252/300 |

Primary Examiner—Benjamin R. Padgett
Assistant Examiner—Deborah L. Kyle
Attorney, Agent, or Firm—John L. Sullivan

[57] ABSTRACT

Optical filters comprised of a plastic film having incorporated therein a mixture of dyes including defined amounts of a copper phthalocyanine sulfonamide compound and a vanadyl phthalocyanine sulfonamide compound are substantially opaque to visible light but permit a high transmission of radiation in the near infrared region.

5 Claims, No Drawings

VISIBLY OPAQUE INFRARED TRANSMITTING OPTICAL FILTER CONTAINING A COMBINATION OF COPPER AND VANADYL PHTHALOCYANINE SULFONAMIDES

This invention relates to filters which are substantially opaque to visible radiation and transparent in the near infrared. More specifically, it relates to a plastic composition containing a mixture of organic dyes which absorb visible light, but allow high transmission of radiation in the near infrared from about 700 to 1200 nanometers.

One important use for filters of this type is in security devices in which an intruder interrupts a beam of light and thereby triggers an alarm device. Clearly, it is very important for such use that all visible light be absorbed so that an intruder cannot detect the beam. Since available infrared detection devices respond best to light in the near infrared, that is light of wavelength slightly longer than 700 nanometers, it is important that filter transmit appreciable quantities of light in the region from 700 to 800 nanometers. It is also desirable that such a filter be easy to produce and handle.

Several visibly opaque infrared transmitting filters are known, but none of them offer the combination of ease of preparation and ideal optical properties which characterize the applicant's filter. Schneeberger, U.S. Pat. No. 3,279,938 discloses a filter in which polypropylene film is coated with a layer of antimony triselenide approximately 40 microns thick. This filter has the requisite optical properties, but is difficult and costly to prepare because antimony triselenide is expensive and the coating must be applied in a partially evacuated system using an expensive inert carrier gas, such as helium. In addition, the optical density of the filter is difficult to vary because layers of antimony triselenide thicker than 40 microns tend to break away from the polypropylene film, and if a thickness greater than 40 microns is required, the substrate film must be coated on both sides.

Brode et al., U.S. Pat. No. 2,579,543, obtained visibly opaque infrared filters by coating a glass support with a resin mixture containing various organic dyes. In the preferred embodiment of this invention, the filter material remains on the glass support. A filter on a glass support is not as convenient as an unsupported filter, because the glass is difficult to shape after the filter material is in place, and glass requires more careful handling than does a plastic film. In addition, these filters suffer from the disadvantages that they do not transmit appreciable quantities of light of wavelength shorter than 750 nanometers and thus absorb in an important region of the near infrared, i.e., from 700 to 750 nanometers.

Shepherd et al. U.S. Pat. No. 2,418,605 discloses the use of vat dyed cellulose films as visibly opaque infrared transmitting filters. These filters absorb light of wavelength shorter than 800 nanometers, and thus block out an even larger region of the near infrared than the Brode et al. filters discussed above.

A major object of the present invention to provide a filter which is stable, self-supporting, easily handled, inexpensive to manufacture, with a maximum transmission of 0.1% for visible light of a wavelength shorter than 700 nanometers, an increase in transmission for light of between 700 and 725 nanometers and a transmission of at least 50% and generally 85–90 percent for light having a wavelength between 725 and 1200 nanometers. Additional objects and advantages of the invention will become obvious from the description which follows. In accordance with the present invention, it has been discovered that a filter with the desired optical properties can be prepared by incorporating into a polymeric film material effective amounts of copper phthalocyanine sulfonamide (formula I) and vanadyl phthalocyanine sulfonamide (formula II) as well as an auxiliary organic dye to absorb the visible light which is not absorbed by the phthalocyanine dyes. The copper phthalocyanine sulfonamide may be represented by the formula:

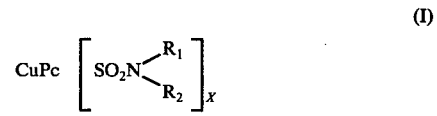

(I)

wherein Pc is the phthalocyanine moiety, $R_1$ and $R_2$ are alkyl from $C_1$ to $C_4$ or $R_1$ is hydrogen and $R_2$ is an alkyl group from $C_4$ to $C_{20}$ and X is a number from 1 to 4, provided that not more than 1 sulfonamide group is present on any single phenyl ring of the phthalocyanine moiety.

The vanadyl phthalocyanine sulfonamide may be represented by the formula:

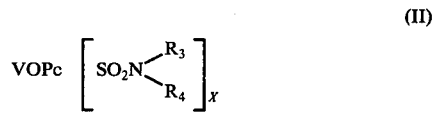

(II)

wherein Pc and X are defined above and $R_3$ and $R_4$ are alkyl from $C_1$ to $C_4$, or $R_3$ is hydrogen and $R_4$ is an alkyl group from $C_4$ to $C_{20}$, provided that not more than one sulfonamide group is present on any single phenyl ring of the phthalocyanine molecule.

Copper and vanadyl phthalocyanine sulfonamides are prepared by reacting copper or vanadyl phthalocyanine with chlorosulfonic acid and thionyl chloride to form sulfonyl chlorides which are further reacted with an amount of a primary or secondary amine, or mixtures of amines sufficient to convert each sulfonyl chloride group into the desired sulfonamide. The number of sulfonyl groups per phthalocyanine moiety can be varied by changing the proportions of sufonating agent and the phthalocyanine.

Amides which are suitable for forming phthalocyanine sulfonamides are secondary amines in which the two alkyl groups range from $C_1$ to $C_4$, such as dimethylamine, dipropylamine, and dibutylamine and primary amines in which the lakyl group ranges from $C_4$ to $C_{20}$, for example, butylamine, hexylamine, octylamine, decylamine, dodecylamine, tetradecylamine, hexadecylamine, octadecylamine and eicosylamine. The average number of sulfonyl chloride groups introduced into the phthalocyanine molecule by this process can be controlled by varying the ratio of phthalocyanine to chlorosulfonic acid used in the reaction. Example I shows the preparation of a typical vanadyl phthalocyanine sulfonamide. The analogous copper phthalocyanine sulfonamide can be prepared in similiar manner.

The plastic material for use in this invention is not critical as long as the mechanical properties and optical properties are not such as to interfere with the filter action. For example, a copolymer of vinyl chloride and 3% vinyl acetate, sold commercially by Union Carbide under the name VYNW-5, is particularly suitable for use in this invention, although polymethylmethacrylate, polyvinylacetate, polyethylene, terephthalate, polystyrene, polycarbonate and cellulosic esters would also be suitable.

The phthalocyanine dyes are important, because they effectively block light in the red region of the spectrum, but provide high transmission in the near infrared. The concentration of the phthalocyanine dyes should be in a narrow range in order to obtain the desired opacity in the visible region and transmission in the near infrared. Specifically, the weight percent of the dye multiplied by the thickness of the film in mils can fall within a range of about 0.02 to 3.5 for copper phthalocyanine sulfonamides containing two lower alkyl groups ($C_1$ to $C_4$) per sulfonyl group and from about 0.35 to 6.13 for a copper phthalocyanine dye containing one alkyl group from $C_4$ to $C_{20}$ per sulfonyl group, and the weight percent of the dye multiplied by thickness of the film can fall in the range of about 0.01 to 0.3 for a vanadyl phthalocyanine sulfonamide dye. Any visible light which may not be absorbed by the phthalocyanine sulfonamides can readily be absorbed by an auxiliary organic dye used in combination with the phthalocyanine sulfonamide provided that these auxiliary dyes do not significantly absorb in the near infrared. The concentration of the auxiliary dye will vary depending on the chemical nature of the same, but whatever dye is selected, it is preferable to select its concentration so as to provide a filter having no more than 0.1 percent transmission in the visible region.

As noted above, any organic dye which does not absorb in the near infrared is suitable for use as an auxiliary dye. For example:
Disazo dyes: Solvent Red 26 (C.I. 26120), Solvent Red 126, Solvent Yellow 87;
Quinoline dyes: Solvent Yellow 33 (C.I. 47000);
Monoazo dyes: Solvent Orange 7 (C.I. 12140), Solvent Red 105, Solvent Yellow 14 (C.I. 12055), Solvent Yellow 71, Solvent Yellow 72, Solvent Violet 24, Solvent Blue 1;
Anthraquinone dyes: Solvent Violet 13 (C.I. 60725), Solvent Violet 14 (C.I. 61705), Solvent Violet 11 (C.I. 61000), Solvent Blue 58, Solvent Blue 59, Solvent Green 3 (C.I. 61565), Solvent Green 24, Solvent Green 25, Acid Green 25 (C.I. 61570), Disperse Red 9 (C.I. 60505);
Triarylmethane dyes: Solvent Violet 8 and Basic Violet 1 (C.I. 42535), Solvent Blue 3 (C.I. 42775), Solvent Green 1 and Basic Green 4 (C.I. 42000);
Azine dye: Solvent Blue 10;
Miscellaneous: Solvent Orange 25.

The following combination of dyes is preferred for use as an auxiliary dye: Acid Green 25 (C.I. 61570), Disperse Red 9 (C.I. 60505), Solvent Violet 13 (C.I. 60725), and Solvent Yellow 14 (C.I. 12055).

The present invention provides a filter with very desirable optical properties in that virtually all visible light is absorbed, and transmission of light increases sharply for wavelengths longer than 700 nanometers. Since the filter is in the form of a film, with the dyes contained internally, it suffers from none of the disadvantages of coated films from which the coating might flake off with rough handling, or from the disadvantages of coatings on a solid substrate which are difficult to shape once the coating is put on the solid substrate.

The following examples are provided for illustrative purposes and may include particular features of the invention. However, the examples should not be construed as limiting the invention, many variations of which are possible without departing from the spirit or scope thereof.

EXAMPLE 1

A. Preparation of Vanadyl Phthalocyanine Sulfonyl Chloride

To 230 grams (128.5 ml.) of chlorosulfonic acid there was added 25 grams (0.0432 mole) of vanadyl phthalocyanine over a period of one-half hour at 25°–50° C. The mixture was then heated at 138°–140° C. for 3 hours. After cooling to 60° C., 32.0 grams (19.5 ml.) of thionyl chloride was added dropwise over a period of 20 minutes. The mixture was then heated to 80° C. with stirring for 2 hours after which it was drowned in a mixture of 700 ml. water, 87 grams of salt and ice to keep the mix at 0°–3° C. After stirring for 15 minutes to insure complete precipitation of the sulfonyl chloride product, the mixture was filtered and the precipitate washed with ice cold water. 255.6 grams of wet filter cake was obtained.

B. Preparation of Sulfonamide

To a slurry of 60 grams of wet cake from A (above) in 100 ml of water and 200 grams of ice, there was added 25.8 g (0.2 mole) of di-n-butylamine. The mixture was stirred for 10 minutes, and 10 grams sodium bicarbonate and 100 ml. acetone added. After stirring cold for 30 minutes, the mixture was heated to 60° C. and stirred an additional 30 minutes. It was then cooled to room temperature, the vanadyl phthalocyanine sulfonamide precipitating as a tar. The liquid portion was decanted and the remaining tar was washed with water by decantation. The tar was then stirred in diulte hydrochloric acid (excess, about 0.5–1 molar) until it solidified. It was filtered, washed and dried. It was then dissolved in 150 ml. of acetone, filtered to remove insolubles and then evaporated to dryness at 70° C.

The product obtained was shown by assay to have an average of 2.8 dibutylsulfonamide groups per a vanadyl phthalocyanine molecule. As above-indicated, however, the procedure may be adjusted to provide a product having an average of from 1 to 4 sulfonamide group per vanadyl phthalocyanine molecule.

EXAMPLE 2

To a suitable vessel was charged 10 grams of VYNW-5 (a copolymer of 97% vinyl chloride and 3% vinyl acetate) and tetrahydrofuran (solvent) to a total volume of 100 ml. The mixture was then stirred until all the polymer dissolved. To this solution the following dyes were added in the amounts shown with stirring to complete solution:

| | | |
|---|---|---|
| 2,2'-Dihydroxy-4-methoxybenzophenone | 0.02 | gram |
| C. I. Acid Green 25 | 0.08 | gram |
| C. I. Disperse Red 9 | 0.07 | gram |
| C. I. Solvent Violet 13 | 0.05 | gram |
| C. I. Solvent Yellow 14 | 0.028 | gram |
| Copper Phthalocyanine Sulfonamide with about 3.5 dibutyl sulfonamide groups per phthalocyanine molecule | 0.05 | gram |
| The Vanadyl Phthalocyanine Sulfonamide prepared in Example 1 | 0.001 | gram |

A portion of the resulting solution was then poured onto a glass plate and drawn down into a film with a drawdown bar. The dried film was 4.4 mils thick and was dark violet. The film is substantially opaque to visible light but shows a rapid increase in transmission at wavelength longer than 700 nanometers as shown by the table below:

| Wavelength in Nanometers | Percent Transmission |
| --- | --- |
| 720 | 10 |
| 740 | 35 |
| 760 | 58 |
| 780 | 68 |
| 800 | 75 |
| 900 | 87 |

EXAMPLE 3

Example 3

| | | |
| --- | --- | --- |
| VYNW-5 Copolymer | 10.0 | grams |
| 2,2'-dihydroxy-4-methoxybenzophenone | 0.02 | grams |
| C.I. Acid Green 25 | 0.08 | grams |
| C.I. Disperse Red 9 | 0.07 | grams |
| C.I. Solvent Violet 13 | 0.05 | grams |
| C.I. Solvent Yellow 14 | 0.028 | grams |
| CuPc $(SO_2NH(CH_2)_{17}CH_3)_{3.6-3.8}$* | 0.088 | grams |
| The Vanadyl Phthalocyanine Sulfonamide prepared in Example 1 | 0.001 | grams |

*Formula 1 in which $R_1$ is hydrogen, $R_2$ is n-octadecyl, and X is 3.6 to 3.8.

The film was made as described in Example 2 and was 4.3 mils thick. The transmission data is similar to that given for Example 2.

I claim:

1. An optical filter which is substantially opaque to visible light but which is transparent to light in the near infrared region comprising a plastic substrate having substantially uniformly dispersed therein, a copper phthalocyanine sulfonamide compound having the formula:

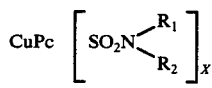

wherein Pc is the phthalocyanine moiety, $R_1$ and $R_2$ are alkyl groups containing from 1 to 4 carbon atoms or $R_1$ is hydrogen and $R_2$ is an alkyl group containing from 4 to 20 carbon atoms; X is a number from 1 to 4, provided that not more than 1 sulfonamide group is present on any single phenyl ring of the phthalocyanine moiety; a vanadyl phthalocyanine sulfonamide compound having the formula:

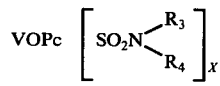

wherein Pc is the phthalocyanine moiety and $R_3$ and $R_4$ are alkyl groups containing from 1 to 4 carbon atoms or $R_3$ is hydrogen and $R_4$ is an alkyl group containing from 4 to 20 carbon atoms and X is a number from 1 to 4, provided that not more than one sulfonamide group is present on any single phenyl ring of the phthalocyanine moiety; and an auxiliary organic dye compound capable of absorbing visible light but which does not absorb in the near said copper phthalocyanine sulfonamide compound being present in the substrate in a weight percent concentration such that said concentration multiplied by the thickness of the substrate in mils is a constant falling within the range of from about 0.02 to about 6.13 and said vanadyl phthalocyanine sulfonamide compound being present in the substrate in a weight percent concentration such that said concentration multiplied by the thickness of the substrate in mils is a constant falling within the range of from about 0.01 to 0.3.

2. An optical filter according to claim 1 wherein in $R_1$, $R_2$ and $R_3$ and $R_4$ are each n-butyl.

3. An optical filter according to claim 1 wherein $R_2$ is n-octadecyl and $R_3$ and $R_4$ are each n-butyl.

4. An optical filter according to claim 1 wherein $R_2$ and $R_4$ are each n-octadecyl.

5. An optical filter according to claim 1 wherein the plastic substrate is a copolymer of 97% vinyl chloride and 3% vinyl acetate.

* * * * *